United States Patent
Ly et al.

(10) Patent No.: US 11,606,820 B2
(45) Date of Patent: Mar. 14, 2023

(54) SHARING A PHYSICAL RANDOM ACCESS CHANNEL (PRACH) CONFIGURATION FOR AVOIDING COLLISIONS OF PRACH COMMUNICATIONS

(71) Applicant: QUALCOMM Incorporated, San Diego, CA (US)

(72) Inventors: Hung Dinh Ly, San Diego, CA (US); Punyaslok Purkayastha, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/021,667

(22) Filed: Sep. 15, 2020

(65) Prior Publication Data

US 2021/0136825 A1    May 6, 2021

Related U.S. Application Data

(60) Provisional application No. 62/928,186, filed on Oct. 30, 2019.

(51) Int. Cl.
*H04W 74/08* (2009.01)

(52) U.S. Cl.
CPC ... *H04W 74/0833* (2013.01); *H04W 74/0816* (2013.01)

(58) Field of Classification Search
CPC ......... H04W 74/0833; H04W 74/0816; H04W 74/085; H04W 74/002; H04W 92/20; H04L 27/26025
See application file for complete search history.

(56) References Cited

U.S. PATENT DOCUMENTS

| | | | |
|---|---|---|---|
| 2019/0116613 A1 | 4/2019 | Abedini et al. | |
| 2019/0261425 A1 | 8/2019 | Park et al. | |
| 2020/0107235 A1* | 4/2020 | Peisa | H04W 36/30 |
| 2020/0396744 A1* | 12/2020 | Xiong | H04W 72/0446 |
| 2021/0007152 A1* | 1/2021 | Park | H04L 5/0053 |
| 2022/0007414 A1* | 1/2022 | Kim | H04W 56/0015 |

OTHER PUBLICATIONS

International Search Report and Written Opinion—PCT/US2020/070544—ISA/EPO—dated Feb. 2, 2021.
OPPO: "On Channel Structure for 2-Step RACH," 3GPP Draft, 3GPP TSG RAN WG1 #96bis ,R1-1905051, 3rd Generation Partnership Project (3GPP), Mobile Competence Centre, 650, Route Des Lucioles, F-06921, Sophia-Antipolis Cedex, France, vol. RAN WG1. No. Xi 'an, China, Apr. 8, 2019-Apr. 12, 2019, Apr. 7, 2019 (Apr. 7, 2019), XP051700150, 12 pages, Retrieved from the Internet: URL: http://www.3gpp.org/ftp/Meetings%5F3GPP%5FSYNC/RAN1/Docs/R1%2D1905051%2Ezip [retrieved on Apr. 7, 2019] the whole document.

* cited by examiner

*Primary Examiner* — Walli Z Butt
(74) *Attorney, Agent, or Firm* — Harrity & Harrity, LLP

(57) ABSTRACT

Various aspects of the present disclosure generally relate to wireless communication. In some aspects, a first base station may determine collision avoidance information for avoiding collisions of physical random access channel communications from one or more user equipment. The collision avoidance information may include subcarrier spacing information and/or beam correspondence information. The first base station may transmit the collision avoidance information to a second base station. Numerous other aspects are provided.

30 Claims, 9 Drawing Sheets

PRACH configuration IEs

| IE/Group Name | Presence | Range | IE type and reference | Semantics description | Criticality | Assigned Criticality |
|---|---|---|---|---|---|---|
| RootSequenceIndex | M | | Integer (0..837) | See section 5.7.2. in TS 36.211 [10] | - | |
| ZeroCorrelationZone Configuration | M | | Integer (0..15) | See section 5.7.2. in TS 36.211 [10] | - | |
| HighSpeedFlag | M | | BOOLEAN | TRUE corresponds to Restricted set and FALSE to Unrestricted set. See section 5.7.2 in TS 36.211 [10] | - | |
| PRACH-FrequencyOffset | M | | Integer (0..94) | See section 5.7.2. in TS 36.211 [10] | - | |
| PRACH-ConfigurationIndex | O | | Integer (0..63) | Mandatory for TDD shall not be present for FDD. See section 5.7.2. in TS 36.211 [10] | - | |

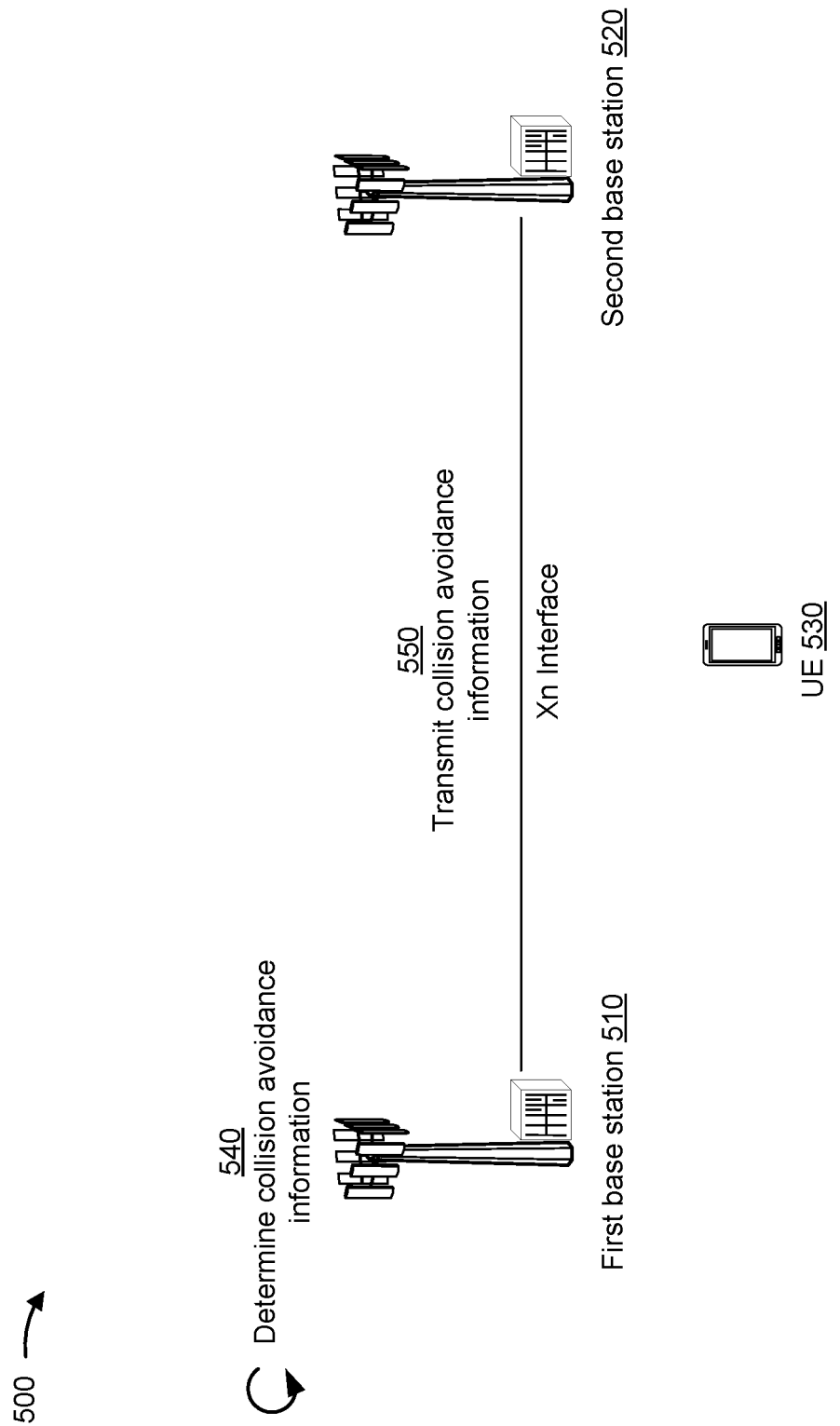

SHARING A PHYSICAL RANDOM ACCESS CHANNEL (PRACH) CONFIGURATION FOR AVOIDING COLLISIONS OF PRACH COMMUNICATIONS

CROSS-REFERENCE TO RELATED APPLICATION

This Patent Application claims priority to Provisional Patent Application No. 62/928,186, filed on Oct. 30, 2019, entitled "SHARING A PHYSICAL RANDOM ACCESS CHANNEL (PRACH) CONFIGURATION FOR AVOIDING COLLISIONS OF PRACH COMMUNICATIONS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for sharing a physical random access channel (PRACH) configuration for avoiding collisions of PRACH communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first base station, may include determining collision avoidance information for avoiding collisions of physical random access channel (PRACH) communications from one or more user equipment (UEs), the collision avoidance information including one or more of subcarrier spacing information or beam correspondence information. The method may include transmitting the collision avoidance information to a second base station.

In some aspects, a method of wireless communication, performed by a first base station, may include receiving, from a second base station, collision avoidance information for avoiding collisions of PRACH communications from one or more UEs, the collision avoidance information including one or more of subcarrier spacing information or beam correspondence information. The method may include determining a PRACH configuration for PRACH communications by the one or more UEs based at least in part on the collision avoidance information and transmitting the PRACH configuration to the one or more UEs.

In some aspects, a first base station for wireless communication may include memory and one or more processors operatively coupled to the memory. The memory and the one or more processors may be configured to determine collision avoidance information for avoiding collisions of PRACH communications from one or more UEs, the collision avoidance information including one or more of subcarrier spacing information or beam correspondence information. The memory and the one or more processors may be configured to transmit the collision avoidance information to a second base station.

In some aspects, a first base station for wireless communication may include memory and one or more processors operatively coupled to the memory. The memory and the one or more processors may be configured to receive, from a second base station, collision avoidance information for avoiding collisions of PRACH communications from one or more UEs, the collision avoidance information including one or more of subcarrier spacing information or beam correspondence information. The memory and the one or more processors may be configured to determine a PRACH configuration for PRACH communications by the one or more UEs based at least in part on the collision avoidance information and transmit the PRACH configuration to the one or more UEs.

In some aspects, a non-transitory computer-readable medium may store one or more instructions for wireless communication. The one or more instructions, when executed by one or more processors of a first base station, may cause the one or more processors to determine collision avoidance information for avoiding collisions of PRACH communications from one or more UEs, the collision avoidance information including one or more of subcarrier spacing information or beam correspondence information. The one or more instructions, when executed by the one or more processors of the first base station, may cause the one or more processors to transmit the collision avoidance information to a second base station.

In some aspects, a non-transitory computer-readable medium may store one or more instructions for wireless communication. The one or more instructions, when executed by one or more processors of a first base station, may cause the one or more processors to receive, from a second base station, collision avoidance information for avoiding collisions of PRACH communications from one or more UEs, the collision avoidance information including one or more of subcarrier spacing information or beam correspondence information. The one or more instructions, when executed by the one or more processors of the first base station, may cause the one or more processors to determine a PRACH configuration for PRACH communications by the one or more UEs based at least in part on the collision avoidance information and transmit the PRACH configuration to the one or more UEs.

In some aspects, a first apparatus for wireless communication may include means for determining collision avoidance information for avoiding collisions of PRACH communications from one or more UEs, the collision avoidance information including one or more of subcarrier spacing information or beam correspondence information, and means for transmitting the collision avoidance information to a second apparatus.

In some aspects, a first apparatus for wireless communication may include means for receiving, from a second apparatus, collision avoidance information for avoiding collisions of PRACH communications from one or more UEs, the collision avoidance information including one or more of subcarrier spacing information or beam correspondence information. The first apparatus may include means for determining a PRACH configuration for PRACH communications by the one or more UEs based at least in part on the collision avoidance information and means for transmitting the PRACH configuration to the one or more UEs.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram conceptually illustrating an example table of physical RACH (PRACH) configuration information elements.

FIG. 5 is a diagram conceptually illustrating an example of base stations sharing PRACH configuration information over an Xn interface, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
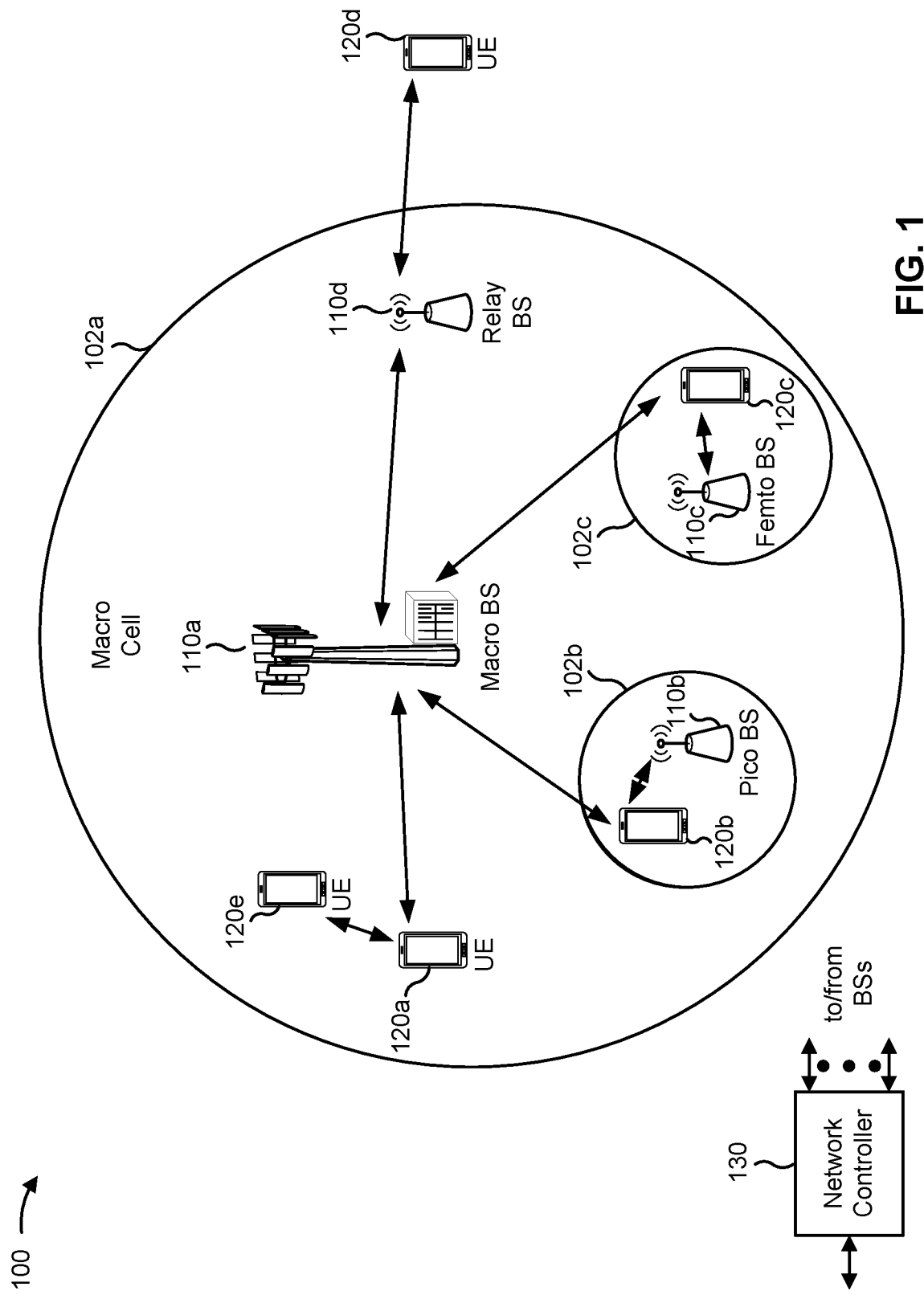
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
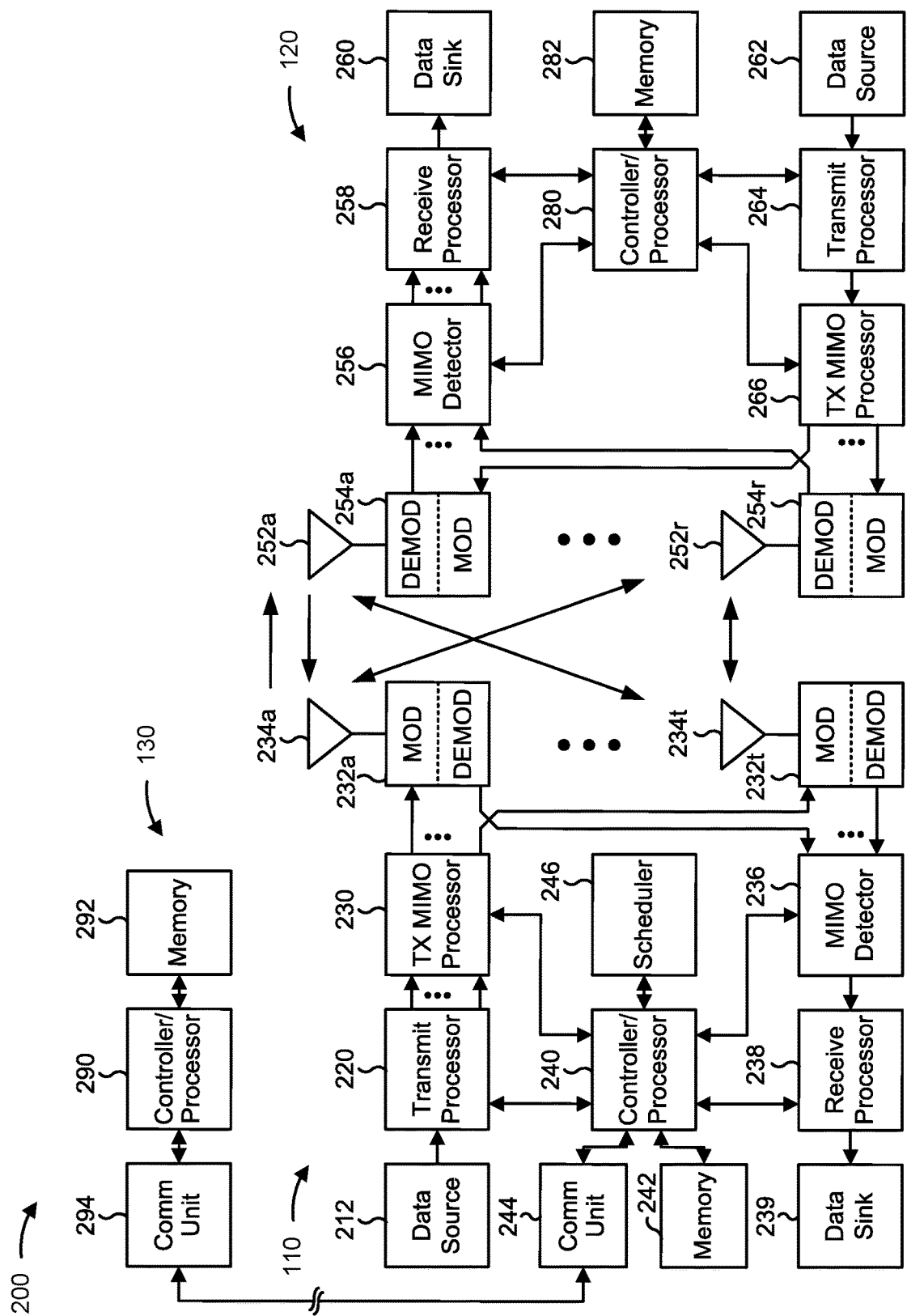
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sharing a physical random access channel (PRACH) configuration for avoiding collisions of PRACH communications, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, base station 110 may include means for determining collision avoidance information for avoiding collisions of PRACH communications from one or more UEs, the collision avoidance information including one or more of subcarrier spacing information or beam correspondence information, means for transmitting the collision avoidance information to a second base station, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for receiving, from a second base station, collision avoidance information for avoiding collisions of PRACH communications from one or more UEs, the collision avoidance information including one or more of subcarrier spacing information or beam correspondence information, means for determining a PRACH configuration for PRACH communications by the one or more UEs based at least in part on the collision avoidance information, means for transmitting the PRACH configuration to the one or more UEs, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may transmit a random access channel (RACH) message to a base station to initiate communication with the base station. The RACH message may be what the UE first transmits when the UE is powered on. The RACH message may be transmitted on a physical random access channel (PRACH) and may be referred to more generally as a PRACH communication. The UE may use the PRACH communication to request an uplink allocation from the base station.

A PRACH communication may include a PRACH sequence (also referred to as a PRACH preamble or a PRACH preamble sequence) that may be used to differentiate UEs. The UE may use a PRACH format to determine the PRACH sequence and/or transmission properties of the PRACH sequence. The UE may receive an initial PRACH configuration in a transmission from the base station and use the initial PRACH configuration for transmitting the PRACH communication. The PRACH communication may initiate a RACH procedure to obtain the uplink allocation.

Figure 3:
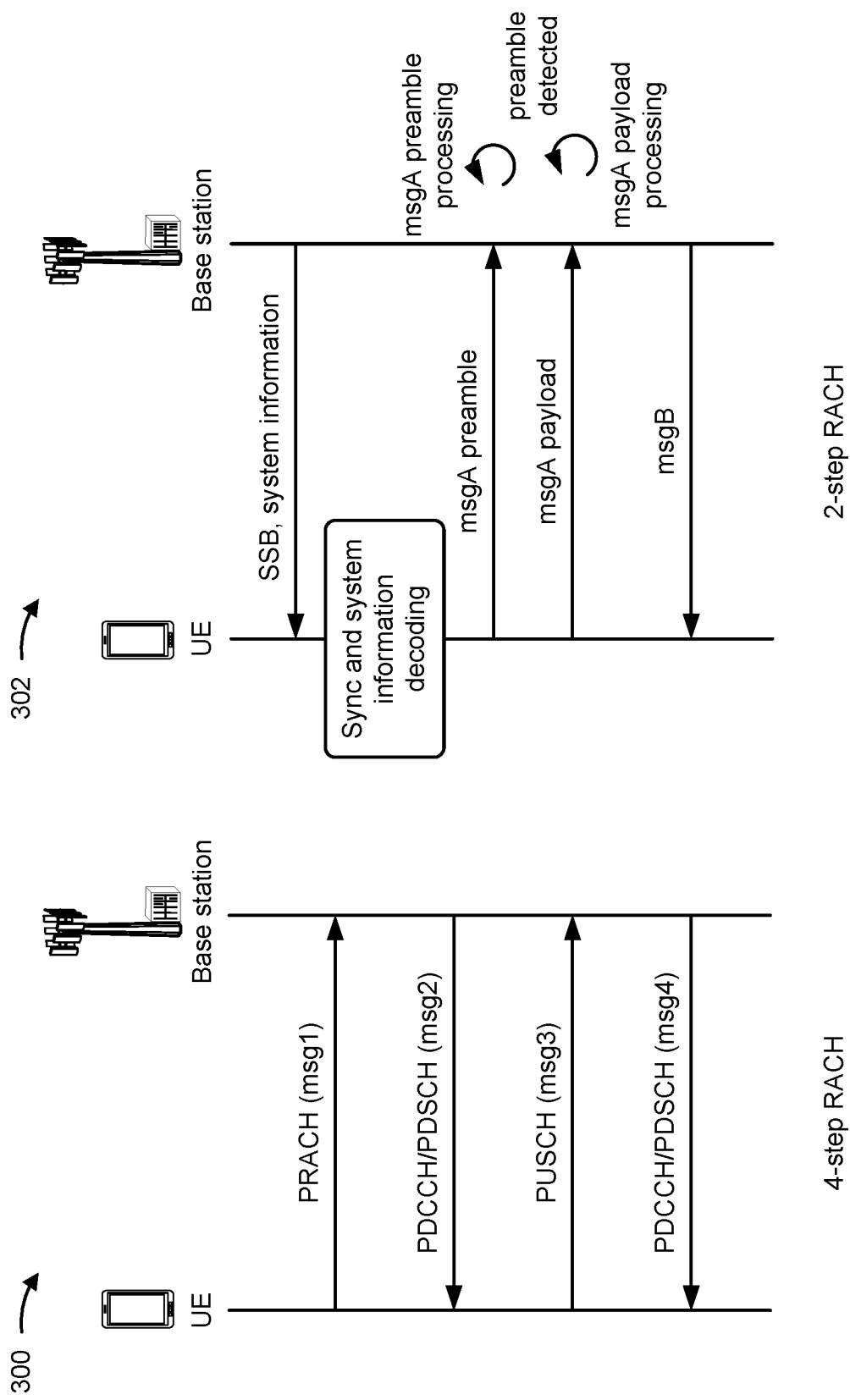
FIG. 3 is a diagram conceptually illustrating an example of a 4-step random access channel (RACH) procedure and an example of a 2-step RACH procedure.

FIG. 3 is a diagram conceptually illustrating an example 300 of a 4-step RACH procedure and an example 302 of a 2-step RACH procedure. In each example, a UE is performing a RACH procedure with a base station.

In LTE and NR, the 4-step RACH procedure may be a RACH procedure with a four message (msg1, msg2, msg3, msg4) handshake between the UE and the base station. The UE may transmit msg1 with a PRACH preamble to the base station on a PRACH. The base station may transmit msg 2 to the UE on a physical downlink control channel (PDCCH) and a physical downlink shared channel (PDSCH). Msg2 may include a random access response. The UE may transmit msg 3 on a physical uplink shared channel (PUSCH). Msg3 may include a contention request and device information. The base station may transmit msg4 on the PDCCH and the PDSCH. Msg4 may include a contention resolution. The contention request and contention resolution relate to resolving contention from multiple UEs that happen to use the same PRACH preamble.

In NR, the 2-step RACH procedure is another RACH procedure. In the 2-step procedure, a base station broadcasts system information and synchronization signal block (SSB) information to UEs. A UE may transmit a PRACH preamble as part of a msgA message to the base station. MsgA may also include a payload. The base station may process the preamble, detect the preamble, and process the payload. The base station may send a response in msgB. Msg1 and msg 3 of the 4-step RACH may be considered to be collapsed into the msgA, and msg 2 and msg4 are considered to be collapsed into msgB.

As indicated above, FIG. 3 is provided as two examples of a RACH procedure. Other examples may differ from what is described with regard to FIG. 3.

A collision of PRACH communications during a RACH procedure (PRACH collision) may occur when two or more UEs send a same PRACH preamble to a base station in a same PRACH time slot. A RACH process that allows for possible collisions (contention) of PRACH communications may be referred to as a contention-based random access (CBRA) process. The 4-step RACH procedure and the 2-step RACH procedure are examples of CBRA processes. A RACH process where a network allocates PRACH preambles so that there is no collision is referred to as a contention-free random access (CFRA) process.

In an LTE network, collisions of PRACH communications may deteriorate PRACH detection performance and have a direct impact on initial UE access, beam failure rates, handover performance, and/or the like. In order to mitigate potential collisions of PRACH communications, neighboring base stations in LTE may share their respective PRACH configurations.

FIG. 4 is a diagram conceptually illustrating an example table 400 of PRACH configuration information elements (IEs) that may be shared in LTE.

Some IEs shown in table 400 may include, for example, RootSequenceIndex, which is a root sequence index used for PRACH sequence generation. ZeroCorrelationZoneConfiguration is used to set a number of root sequences required per cell for a selected PRACH. HighSpeedFlag indicates whether a restricted set or an unrestricted set of sequences may be used for calculating a cyclic shift interval for generating sequences. PRACH-FrequencyOffset defines a frequency position of a preamble. PRACH-ConfigurationIndex is used to determine a preamble format.

A UE may include frequency domain resources in RACH procedure messaging. For example, Msg1-FDM (frequency division multiplexing) may indicate a number of PRACH transmission occasions multiplexed in one time instance. Msg1-FrequencyStart may indicate an offset of a lowest PRACH transmission occasion in frequency domain with respect to physical resource block 0. The offset may be configured so that a corresponding RACH resource is entirely within a bandwidth of an uplink bandwidth part.

As indicated above, FIG. 4 is provided as an example. Other examples may differ from what is described with regard to FIG. 4.

A base station in LTE may optimize a PRACH configuration using parameters from neighboring base stations. However, NR involves NR features not present in LTE. The NR features are not accounted for with respect to PRACH collision avoidance. The NR features may include, for example, multiple subcarrier spacings for sequence lengths and multi-beam transmissions. Base stations that do not account for these NR features may experience collisions of PRACH communications. Collisions of PRACH communications may waste power, processing (e.g., memory, processors), and signaling resources.

According to some aspects described herein, a first base station may share PRACH configuration information with a second base station. The PRACH configuration information may include collision avoidance information relevant to the NR features. For example, multiple subcarrier spacings (SCSs) for different sequence lengths are a part of NR. For a sequence length of 839, a UE may be configured with an SCS of a PRACH sequence from {1.25, 5} kHz. For a sequence length of 139, a UE may be configured with an SCS from {15, 30, 60, 120} kHz. In some aspects, base stations may, given a same frequency resource and a same root sequence index, use different PRACH SCSs to help reduce collisions of PRACH communications. In this way, base stations may reduce collisions of PRACH communications in NR by sharing collision avoidance information that accounts for multiple SCSs in NR.

Additionally, or alternatively, base stations may share collision avoidance information that includes beam correspondence information. The beam correspondence information may indicate an SSB and/or a corresponding SSB-to-RACH occasion (time/frequency resource) (RO) mapping. The SSB may correspond to a beam and be an SS/physical broadcast channel (SS/PBCH) block that carries synchronization signals and a master information block (MIB). A base station may use the SSB and/or the SSB-to-RO mapping in the beam correspondence information to select an SSB and/or an RO for PRACH communications that are different than the SSB and/or the RO indicated in the beam correspondence information.

Accordingly, the base station, and UEs transmitting PRACH communications, may avoid collisions of PRACH communications and save power, processing (e.g., memory, processors), and signaling resources that may have otherwise been wasted by the collisions of the PRACH communication.

FIG. 5 is a diagram conceptually illustrating an example 500 of base stations sharing PRACH configuration information over an Xn interface, in accordance with various aspects of the present disclosure. FIG. 5 illustrates a first base station 510 (e.g., gNB) that may communicate with a second base station 520 (e.g., gNB) over an interface (e.g., Xn interface). First base station 510 and second base station 520 may each receive a PRACH communication from UE 530 for a RACH procedure. UE 530 may represent one or more UEs.

As shown by reference number 540, first base station 510 may determine collision avoidance information for avoiding collisions of PRACH communications from UEs, such as UE 530. The collision avoidance information may include subcarrier spacing information and/or beam correspondence information, which corresponds to new features in NR. First base station 510 may prepare the collision avoidance information for sharing with other base stations to use in optimizing a PRACH configuration for UEs.

The subcarrier spacing information may indicate a first subcarrier spacing (SCS), from among a plurality of SCSs for PRACH, that is used by first base station 510 for configuring PRACH communications by UEs. In some aspects, the collision avoidance information indicates a frequency resource and a root sequence index for PRACH sequence generation used by first base station 510 for configuring PRACH communications by UEs.

Because NR supports multi-beam operation, the collision avoidance information may include beam correspondence information. Beam correspondence information may include SSB transmission information. For example, the SSB transmission information may include information about what SSB (and corresponding beam) that first base station 510 configures UEs to use for PRACH communications. The SSB is relevant because a UE may transmit PRACH communications with a transmitting beam (uplink spatial filter) that corresponds to a receiving beam the UE uses for successfully receiving the SSB. In some aspects, a UE may transmit multiple SSBs, such as up to N=8 SSBs for frequency range 1 (FR1) and up to N=64 SSBs for FR2. Accordingly, first base station 510 may transmit SSB information with multiple SSBs. First base station 510 may transmit a bitmap ssb-PositionsInBurst to indicate which SSBs out of N SSBs are being transmitted by UEs associated with first base station 510.

Additionally, or alternatively, the beam correspondence information includes an SSB-to-RO mapping used by first base station 510 for configuring PRACH communications by UEs. In some aspects, there is one RO for one SSB. In some aspects, there are a plurality of ROs for one SSB. Based at least in part on a time slot and a frequency resource, there may be up to 128 ROs that may be selected for a PRACH configuration.

As shown by reference number 550, first base station 510 may transmit the collision avoidance information to second base station 520 in defined message types. In some aspects, first base station 510 may transmit the subcarrier spacing information in a msg1-SubcarrierSpacing message. In some aspects, first base station 510 may transmit the beam correspondence information that includes SSB transmission information and/or an SSB-RO mapping. First base station 510 may transmit the SSB transmission information in an ssb-PositionsInBurst message. First base station 510 may transmit the SSB-RO mapping in an ssb-perRACH-OccasionAndCB-PreamblesPerSSB message.

An ssb-PositionsInBurst message may indicate time domain positions of transmitted SSBs (also referred to as SS/PBCH (physical broadcast channel) blocks) in a half frame with SS/PBCH blocks. A first (leftmost) bit corresponds to SS/PBCH block index 0, a second bit corresponds to SS/PBCH block index 1, and/or the like. Value 0 indicates that the corresponding SS/PBCH block is not transmitted while value 1 indicates that the corresponding SS/PBCH block is transmitted. In some aspects, different bits and/or different values may be used.

An ssb-perRACH-OccasionAndCB-PreamblesPerSSB message may include a CHOICE field and an ENUMERATED field. The CHOICE field may indicate a number of SSBs per RO. Value oneEighth corresponds to one SSB associated with 8 ROs, value oneFourth corresponds to one SSB associated with 4 ROs, and/or the like. The ENUMERATED field may indicate a number of contention based preambles per SSB. Value n4 corresponds to 4 contention based preambles per SSB, value n8 corresponds to 8 contention based preambles per SSB, and/or the like. A total number of CB preambles in an RO may be given by CB-preambles-per-SSB*max(1, SSB per-rach-occasion).

For a CFRA process, first base station 510 may transmit an SSB index or a channel state information reference signal (CSI-RS) resource that first base station 510 may indicate to UEs. Each of these UEs may transmit a PRACH communication in a transmitting beam corresponding to a receiving beam used for receiving an SSB or a CSI-RS. First base station 510 may transmit the SSB and/or the CSI-RS resource in an information element (IE) of a RACH-ConfigDedicated message. First base station 510 may transmit, in the collision avoidance information, an identifier for the CSI-RS resource. The CSI-RS resource may be defined in a measurement object associated with a serving cell. First base station 510 may transmit, in the collision avoidance information, an identifier of the SSB, which may be an SSB transmitted by the serving cell. The SSB and/or the CSI-RS resource may be useful for handover scenarios, beam failure detection, recovery, and/or the like. Other base stations, such as second base station 520, may use the collision avoidance information transmitted by first base station 510 to optimize a PRACH configuration for UEs (e.g., UE 530) such that collisions of PRACH communications by the UEs may be reduced.

As indicated above, FIG. 5 is provided as an example. Other examples may differ from what is described with regard to FIG. 5.

Figure 6:
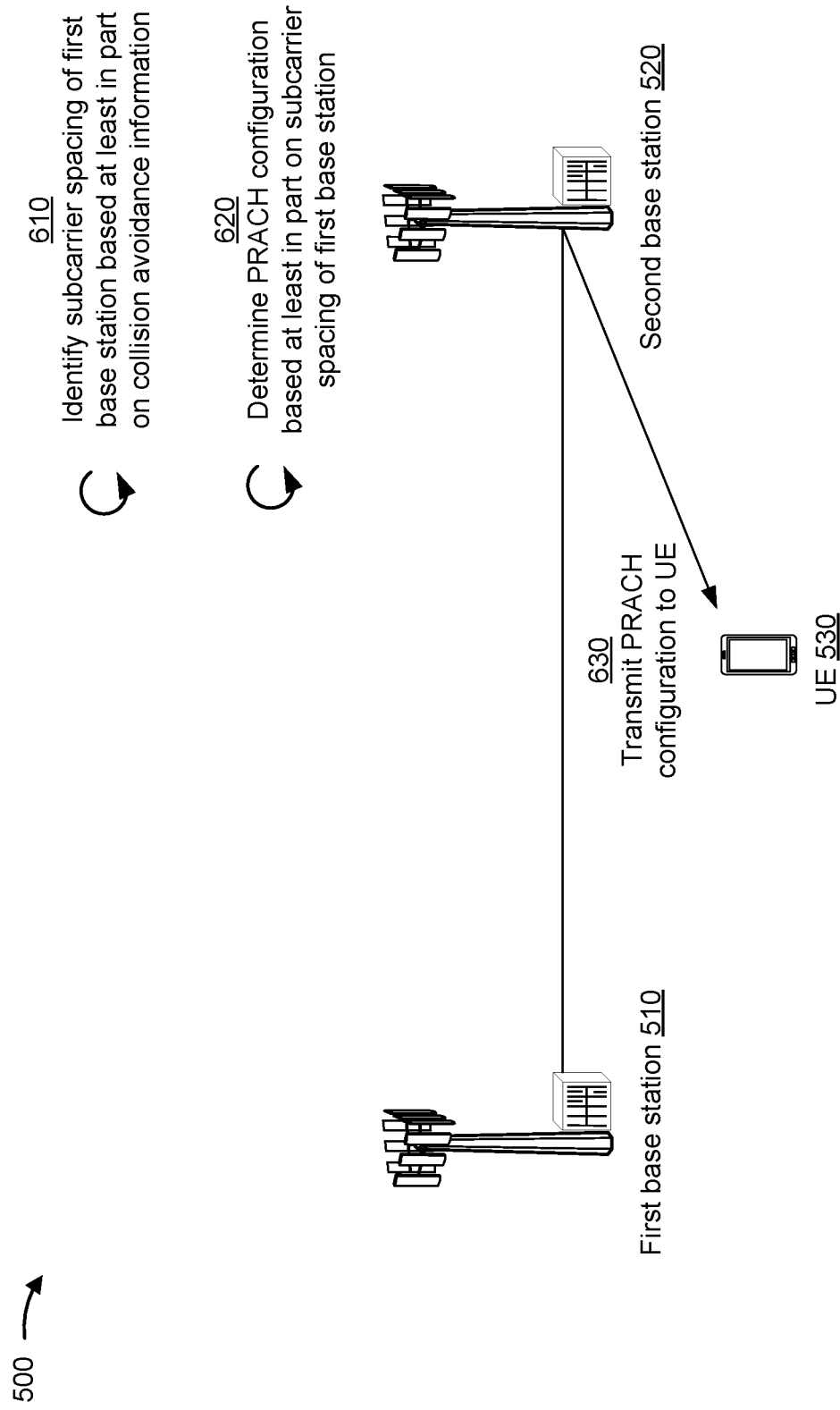
FIG. 6 is a diagram further illustrating the example of the base stations sharing PRACH configuration information over the Xn interface, in accordance with various aspects of the present disclosure.

FIG. 6 is a diagram further illustrating the example 500 of the base stations sharing PRACH configuration information over the Xn interface, in accordance with various aspects of the present disclosure. First base station 510 and second base station 520 are again shown in FIG. 6, but this figure illustrates second base station's 520 use of the collision avoidance information that second base station 520 receives from first base station 510 over the Xn interface. In FIG. 6, the collision avoidance information may include subcarrier spacing information.

Second base station 520 may determine a PRACH configuration for PRACH communications by one or more UEs based at least in part on the collision avoidance information, or more specifically, subcarrier spacing information of first base station 510. As shown by reference number 610, second base station 520 may, after receiving the collision avoidance information from first base station 510, identify an SCS of first base station 510 based at least in part on the collision avoidance information. For a sequence length of 839, an SCS of a PRACH sequence may be configured from {1.25, 5} kHz. For a sequence length of 139, an SCS of a PRACH sequence may be configured from {15, 30, 60, 120} kHz. Second base station 520 may identify which SCS, from among possible SCSs for PRACH, first base station 510 is using for a PRACH configuration.

As shown by reference number 620, second base station 520 may determine the PRACH configuration for the one or more UEs associated with second base station 520 by selecting an SCS for the PRACH configuration that is different than the SCS identified as being used by first base station 510. In some aspects, the collision avoidance information may also indicate the frequency resource and the root sequence index for PRACH sequence generation used by first base station 510. That is, even though first base station 510 and second base station 520 use a same frequency resource and a same root sequence index, first base station 510 and second base station 520 may use different SCSs. For example, given the same frequency resource and the same root sequence index, second base station 520 may identify that first base station 510 is using a 15 kHz SCS for PRACH configurations for UEs associated with first base station 510. Accordingly, second base station 520 may select a 60 kHz SCS for PRACH configurations for the one or more UEs associated with second base station 520.

In some aspects, second base station 520 may implement a first detector for a given PRACH SCS (e.g., 60 kHz) that may not be able to detect a PRACH SCS of a same sequence length (e.g., 139) but different SCS (e.g., 15 kHz). Second base station 520 may implement a second detector for a 15 kHz SCS, 120 kHz SCS, and/or the like. In some aspects, the collision avoidance information may include sequence length information.

As shown by reference number 630, second base station 520 may transmit the PRACH configuration to the one or more UEs, including UE 530. In some aspects, second base station 520 may broadcast the PRACH configuration to the one or more UEs as an update that follows an initial PRACH configuration. Each UE that receives the broadcast may update a PRACH configuration of the UE and use the PRACH configuration for transmitting a PRACH communication.

As indicated above, FIG. 6 is provided as an example. Other examples may differ from what is described with regard to FIG. 6.

Figure 7:
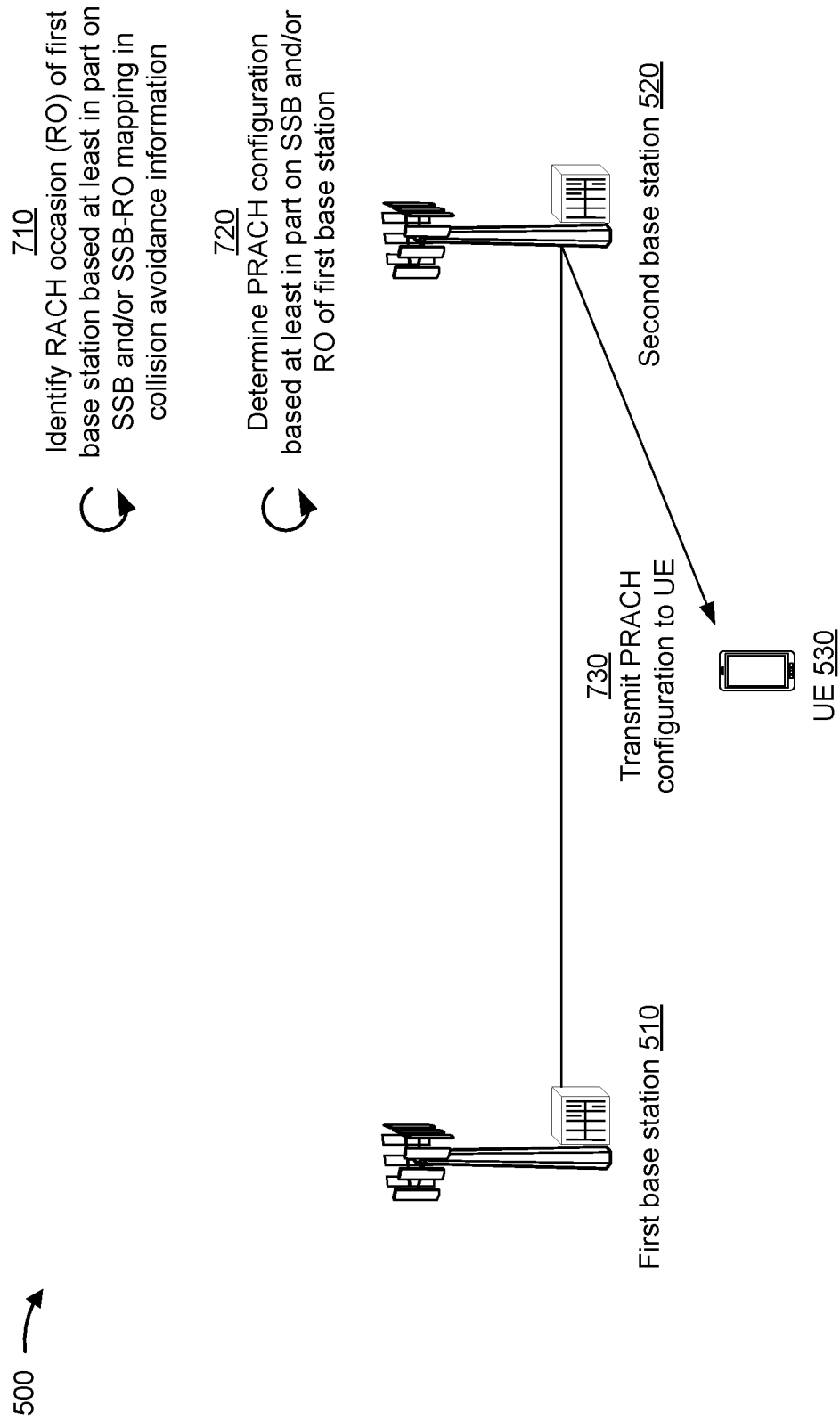
FIG. 7 is a diagram further illustrating the example of the base stations sharing PRACH configuration information over the Xn interface, in accordance with various aspects of the present disclosure.

FIG. 7 is a diagram further illustrating the example 500 of the base stations sharing PRACH configuration information over the Xn interface, in accordance with various aspects of the present disclosure. First base station 510 and second base station 520 are again shown in FIG. 7, but this figure illustrates second base station's 520 use of the collision avoidance information that second base station 520 receives from first base station 510 over the Xn interface. In FIG. 7, the collision avoidance information may include beam correspondence information.

The beam correspondence information may include SSB transmission information. As shown by reference number 710, second base station 520 may identify an SSB used by first base station 510 for PRACH configurations, based at least in part on the SSB transmission information in the beam correspondence information. As shown by reference number 720, second base station 520 may determine the PRACH configuration for the one or more UEs by selecting an SSB for the PRACH configuration that is different than an SSB indicated by the SSB transmission information.

Additionally, or alternatively, the beam correspondence information may include an SSB-to-RO mapping. As shown by reference number 710, second base station 520 may identify a first RO of first base station 510, based at least in part on the SSB transmission information and/or the SSB-to-RO mapping in the beam correspondence information. As shown by reference number 720, second base station 520 may determine the PRACH configuration for the one or more UEs by selecting a second RO for the PRACH configuration that is different than the first RO.

In some aspects, for a CFRA process, second base station 520 may provide a serving cell, and the collision avoidance information may include beam correspondence information that indicates a first CSI-RS resource. Second base station 520 may determine the PRACH configuration by selecting a different CSI-RS resource than the first CSI-RS resource for the PRACH configuration. Additionally, or alternatively, the beam correspondence information may indicate a first SSB identifier. Second base station 520 may determine the PRACH configuration by selecting a different SSB identifier than the first SSB identifier for the PRACH configuration.

As shown by reference number 730, second base station 520 may transmit the PRACH configuration to the one or more UEs. In some aspects, second base station 520 may broadcast the PRACH configuration as an update that follows an initial PRACH configuration. Each UE that receives the broadcast may update a PRACH configuration of the UE and use the PRACH configuration for transmitting a PRACH communication.

As indicated above, FIG. 7 is provided as an example. Other examples may differ from what is described with regard to FIG. 7.

FIGS. 5-7 are used to describe first base station 510 sharing collision avoidance information with second base station 520. In some aspects, second base station 520 may share collision avoidance information with first base station 510. In some aspects, first base station 510 may share first collision avoidance information with second base station 520 and second base station 520 may share second collision avoidance information with first base station 510.

First base station 510 and second base station 520 may operate more efficiently by optimizing PRACH configurations to avoid collisions in PRACH communications in an NR network. Even though a same root and a same SCS may be used by first base station 510 and second base station 520, second base station 520 may optimize PRACH communications of UEs. In some aspects, an optimized PRACH configuration may correspond to communication, by a UE, of a message associated with a 4-step RACH procedure. In some aspects, the optimized PRACH configuration may correspond to communication of a message (e.g., msgA preamble) associated with a 2-step RACH procedure.

Figure 8:
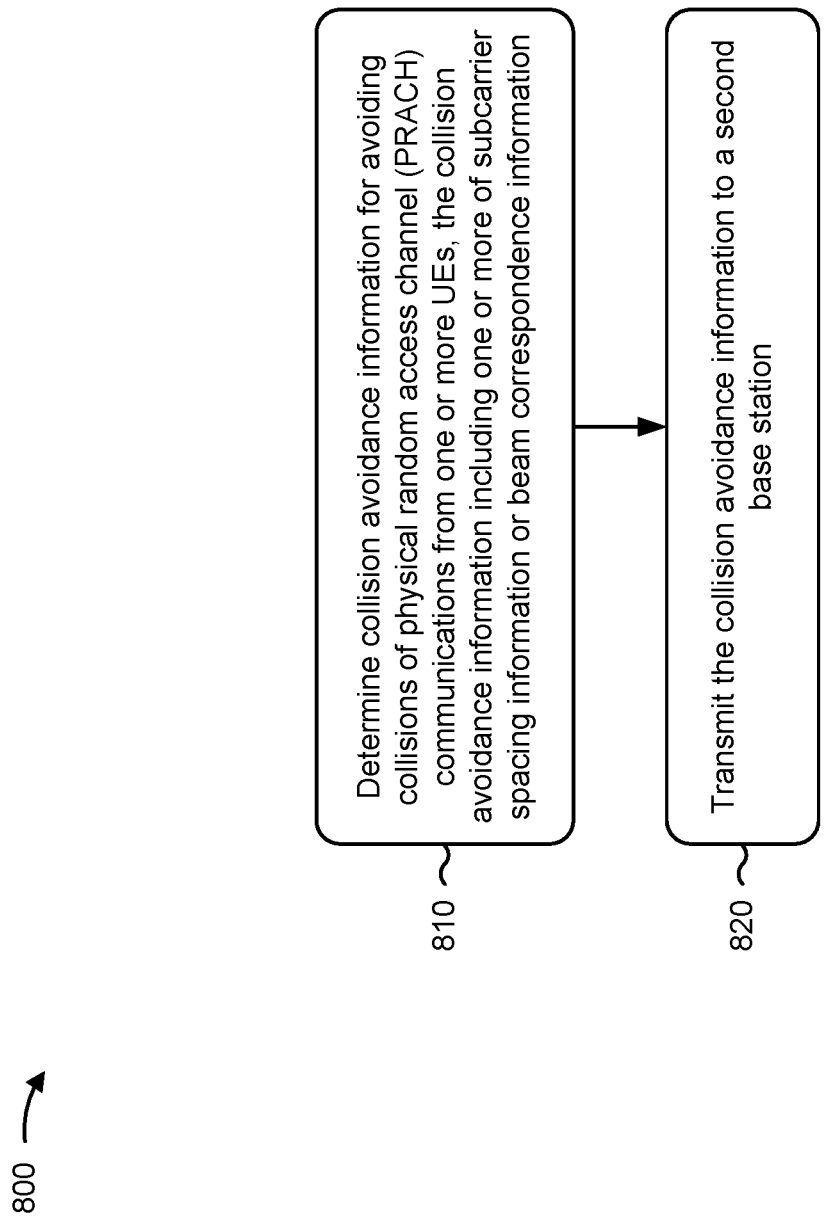
FIG. 8 is a diagram illustrating an example process performed, for example, by a base station, in accordance with various aspects of the present disclosure.

FIG. 8 is a diagram illustrating an example process 800 performed, for example, by a first base station, in accordance with various aspects of the present disclosure. Example process 800 is an example where a first base station (e.g., base station 110, first base station 510, and/or the like) performs operations associated with sharing PRACH configuration information for avoiding collisions in PRACH communications.

As shown in FIG. 8, in some aspects, process 800 may include determining collision avoidance information for avoiding collisions of PRACH communications from one or more UEs (block 810). In some aspects, the collision avoidance information includes one or more of subcarrier spacing information or beam correspondence information. For example, the first base station (e.g., using transmit processor 220, receive processor 238, controller/processor 240, memory 242, and/or the like) may determine collision avoidance information for avoiding collisions of PRACH communications from one or more UEs, as described above. In some aspects, the collision avoidance information includes one or more of subcarrier spacing information or beam correspondence information.

As further shown in FIG. 8, in some aspects, process 800 may include transmitting the collision avoidance information to a second base station (block 820). For example, the first base station (e.g., using transmit processor 220, receive processor 238, controller/processor 240, memory 242, and/or the like) may transmit the collision avoidance information to a second base station, as described above.

Process 800 may include additional aspects, such as any single aspect or any combination of aspects described below and/or in connection with one or more other processes described elsewhere herein.

In a first aspect, transmitting the collision avoidance information includes transmitting the collision avoidance information to the second base station over an Xn interface.

In a second aspect, alone or in combination with the first aspect, the collision avoidance information includes the subcarrier spacing information. In some aspects, the subcarrier spacing information indicates a first subcarrier spacing, from among a plurality of subcarrier spacings for PRACH, that is used by the first base station for configuring PRACH communications by UEs.

In a third aspect, alone or in combination with one or more of the first and second aspects, the collision avoidance information indicates a frequency resource and a root sequence index for PRACH sequence generation used by the first base station for configuring PRACH communications by UEs.

In a fourth aspect, alone or in combination with one or more of the first through third aspects, the collision avoidance information includes the beam correspondence information. In some aspects, the beam correspondence information includes SSB transmission information.

In a fifth aspect, alone or in combination with one or more of the first through fourth aspects, the beam correspondence information further includes an SSB-to-RO mapping used by the first base station for configuring PRACH communications by UEs.

In a sixth aspect, alone or in combination with one or more of the first through fifth aspects, the first base station provides a serving cell and the collision avoidance information includes the beam correspondence information. In some aspects, the beam correspondence information indicates one of a CSI-RS resource in a measurement object for the serving cell or a SSB identifier for the serving cell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
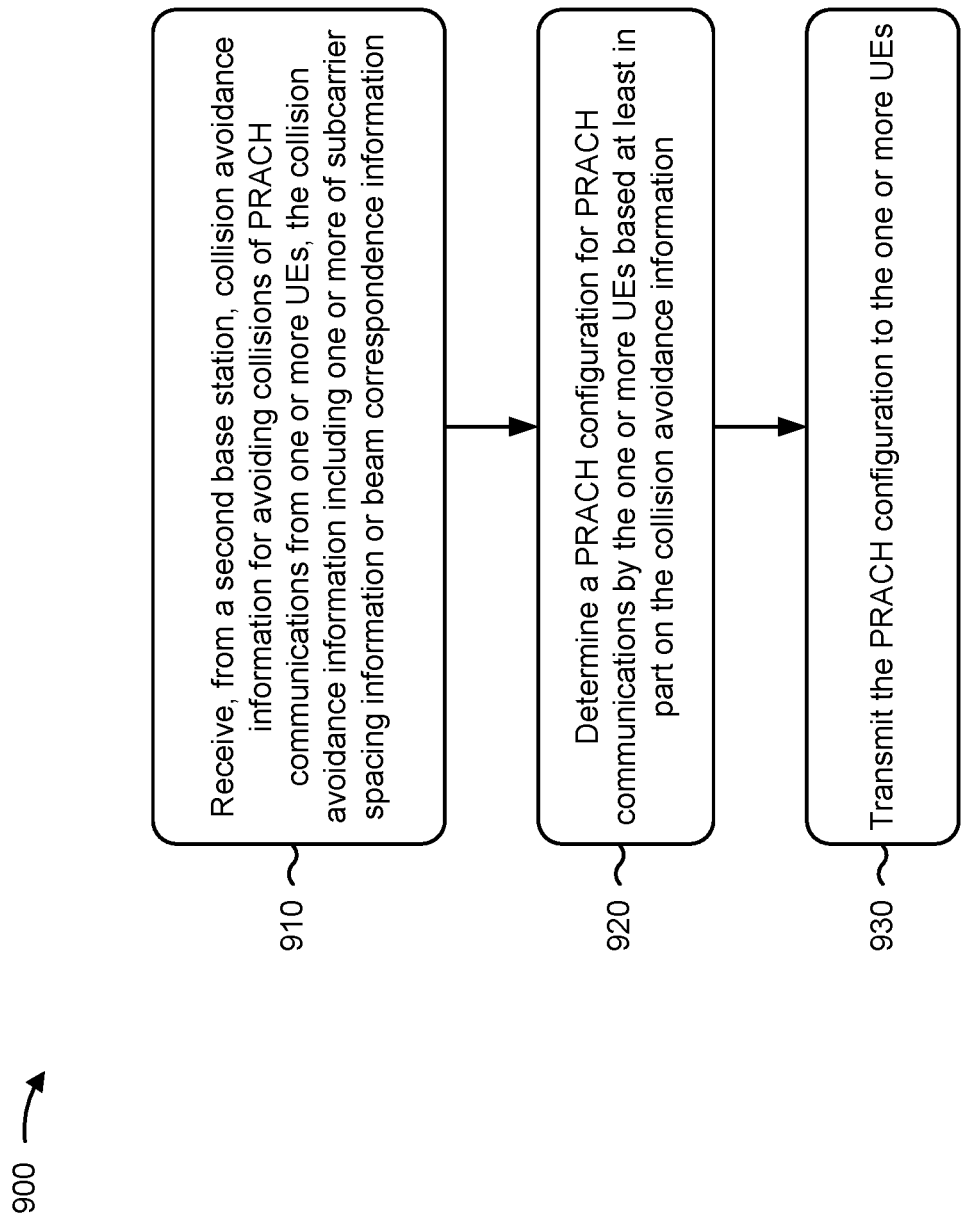
FIG. 9 is a diagram illustrating an example process performed, for example, by a base station, in accordance with various aspects of the present disclosure.

FIG. 9 is a diagram illustrating an example process 900 performed, for example, by a first base station, in accordance with various aspects of the present disclosure. Example process 900 is an example where a first base station (e.g., base station 110, first base station 510, and/or the like) performs operations associated with sharing PRACH configuration information for avoiding collisions in PRACH communications.

As shown in FIG. 9, in some aspects, process 900 may include receiving, from a second base station, collision avoidance information for avoiding collisions of PRACH communications from one or more UEs (block 910). In some aspects, the collision avoidance information includes one or more of subcarrier spacing information or beam correspondence information. For example, the first base station (e.g., using transmit processor 220, receive processor 238, controller/processor 240, memory 242, and/or the like) may receive, from a second base station, collision avoidance information for avoiding collisions of PRACH communications from one or more UEs, as described above. In some aspects, the collision avoidance information includes one or more of subcarrier spacing information or beam correspondence information.

As further shown in FIG. 9, in some aspects, process 900 may include determining a PRACH configuration for PRACH communications by the one or more UEs based at least in part on the collision avoidance information (block 920). For example, the first base station (e.g., using transmit processor 220, receive processor 238, controller/processor 240, memory 242, and/or the like) may determine a PRACH configuration for PRACH communications by the one or more UEs based at least in part on the collision avoidance information, as described above.

As further shown in FIG. 9, in some aspects, process 900 may include transmitting the PRACH configuration to the one or more UEs (block 930). For example, the first base station (e.g., using transmit processor 220, receive processor 238, controller/processor 240, memory 242, and/or the like) may transmit the PRACH configuration to the one or more UEs, as described above.

Process 900 may include additional aspects, such as any single aspect or any combination of aspects described below and/or in connection with one or more other processes described elsewhere herein.

In a first aspect, receiving the collision avoidance information includes receiving the collision avoidance information over an Xn interface.

In a second aspect, alone or in combination with the first aspect, the collision avoidance information includes the subcarrier spacing information. In some aspects, the subcarrier spacing information indicates a first subcarrier spacing from among a plurality of subcarrier spacings for PRACH. In some aspects, determining the PRACH configuration includes selecting a second subcarrier spacing for the PRACH configuration that is different than the first subcarrier spacing.

In a third aspect, alone or in combination with one or more of the first and second aspects, the collision avoidance information indicates a frequency resource and a root sequence index for PRACH sequence generation. In some aspects, determining the PRACH configuration includes selecting the frequency resource and the root sequence index for PRACH sequence generation for the PRACH configuration.

In a fourth aspect, alone or in combination with one or more of the first through third aspects, the collision avoidance information includes the beam correspondence information. In some aspects, the beam correspondence information includes SSB transmission information. In some aspects, determining the PRACH configuration includes selecting an SSB for the PRACH configuration that is different than an SSB indicated by the SSB transmission information.

In a fifth aspect, alone or in combination with one or more of the first through fourth aspects, the collision avoidance information includes the beam correspondence information. In some aspects, the beam correspondence information includes SSB transmission information and an SSB-to-RO mapping. In some aspects, determining the PRACH configuration includes identifying a first RO based at least in part on the SSB transmission information and the SSB-to-RO mapping and selecting a second RO for the PRACH configuration that is different than the first RO.

In a sixth aspect, alone or in combination with one or more of the first through fifth aspects, the second base station provides a serving cell and the collision avoidance information includes the beam correspondence information. In some aspects, the beam correspondence information indicates a first CSI-RS resource in a measurement object for the serving cell. In some aspects, determining the PRACH configuration includes selecting a different CSI-RS resource than the first CSI-RS resource for the PRACH configuration.

In a seventh aspect, alone or in combination with one or more of the first through sixth aspects, the second base station provides a serving cell and the collision avoidance information includes the beam correspondence information. In some aspects, the beam correspondence information indicates a first SSB identifier for the serving cell. In some aspects, determining the PRACH configuration includes selecting a different SSB identifier than the first SSB identifier for the PRACH configuration.

In an eighth aspect, alone or in combination with one or more of the first through seventh aspects, the PRACH configuration corresponds to communication of a message associated with a 4-step RACH procedure.

In a ninth aspect, alone or in combination with one or more of the first through eighth aspects, the PRACH configuration corresponds to communication of a message associated with a 2-step RACH procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first base station, comprising:
   determining collision avoidance information for avoiding collisions of physical random access channel (PRACH) communications from one or more user equipment (UEs), the collision avoidance information including subcarrier spacing information indicating a first channel state information resource signal (CSI-RS) resource, a first subcarrier spacing, from among a plurality of subcarrier spacings for PRACH, that is used by the first base station for configuring PRACH communications by UEs, and beam correspondence information indicating a first synchronization signal block (SSB) identifier; and
   transmitting the collision avoidance information to a second base station.

2. The method of claim 1, wherein transmitting the collision avoidance information includes transmitting the collision avoidance information to the second base station over an Xn interface.

3. The method of claim 1, wherein the collision avoidance information indicates a frequency resource and a root sequence index for PRACH sequence generation used by the first base station for configuring PRACH communications by UEs.

4. The method of claim 1, wherein the beam correspondence information includes synchronization signal block (SSB)SSB transmission information.

5. The method of claim 1, wherein the beam correspondence information further includes an SSB-to-RACH occasion (RO) mapping used by the first base station for configuring PRACH communications by UEs.

6. The method of claim 1, wherein the first base station provides a serving cell and the beam correspondence information indicates one of a channel state information resource signal (CSI-RS) resource in a measurement object for the serving cell or a synchronization signal block (SSB) identifier for the serving cell.

7. A method of wireless communication performed by a first base station, comprising:
  receiving, from a second base station, collision avoidance information for avoiding collisions of physical random access channel (PRACH) communications from one or more user equipment (UEs), the collision avoidance information including one or more of subcarrier spacing information indicating a first channel state information resource signal (CSI-RS) resource or beam correspondence information indicating a first synchronization signal block (SSB) identifier;
  determining a PRACH configuration for PRACH communications by the one or more UEs based at least in part on the collision avoidance information, wherein determining the PRACH configuration includes selecting one or more of:
    a different CSI-RS resource than the first CSI-RS resource for the PRACH configuration, or
    a different SSB identifier than the first SSB identifier for the PRACH configuration; and
  transmitting the PRACH configuration to the one or more UEs.

8. The method of claim 7, wherein receiving the collision avoidance information includes receiving the collision avoidance information over an Xn interface.

9. The method of claim 7, wherein the collision avoidance information includes the subcarrier spacing information, the subcarrier spacing information indicating a first subcarrier spacing from among a plurality of subcarrier spacings for PRACH, and wherein determining the PRACH configuration includes selecting a second subcarrier spacing for the PRACH configuration that is different than the first subcarrier spacing.

10. The method of claim 7, wherein the collision avoidance information indicates a frequency resource and a root sequence index for PRACH sequence generation, and wherein determining the PRACH configuration includes selecting the frequency resource and the root sequence index for PRACH sequence generation for the PRACH configuration.

11. The method of claim 7, wherein the collision avoidance information includes the beam correspondence information, the beam correspondence information including SSB transmission information, and wherein determining the PRACH configuration includes selecting an SSB for the PRACH configuration that is different than an SSB indicated by the SSB transmission information.

12. The method of claim 7, wherein the collision avoidance information includes the beam correspondence information, the beam correspondence information including SSB transmission information and an SSB-to-RACH occasion (RO) mapping, and wherein determining the PRACH configuration includes identifying a first RO based at least in part on the SSB transmission information and the SSB-to-RO mapping and selecting a second RO for the PRACH configuration that is different than the first RO.

13. The method of claim 7, wherein the second base station provides a serving cell and the collision avoidance information includes the beam correspondence information, the beam correspondence information indicating the first CSI-RS resource in a measurement object for the serving cell.

14. The method of claim 7, wherein the second base station provides a serving cell and the collision avoidance information includes the beam correspondence information, the beam correspondence information indicating the first SSB identifier for the serving cell.

15. The method of claim 7, wherein the PRACH configuration corresponds to communication of a message associated with a 4-step RACH procedure.

16. The method of claim 7, wherein the PRACH configuration corresponds to communication of a message associated with a 2-step RACH procedure.

17. A first base station for wireless communication, comprising:
  a memory; and
  one or more processors coupled to the memory, the one or more processors configured to:
    determine collision avoidance information for avoiding collisions of physical random access channel (PRACH) communications from one or more user equipment (UEs), the collision avoidance information including subcarrier spacing information, a first subcarrier spacing, from among a plurality of subcarrier spacings for PRACH, that is used by the first base station for configuring PRACH communications by UEs, and beam correspondence information; and
    transmit the collision avoidance information to a second base station.

18. The first base station of claim 17, wherein the one or more processors, when transmitting the collision avoidance information, are configured to transmit the collision avoidance information to the second base station over an Xn interface.

19. The first base station of claim 17, wherein the collision avoidance information indicates a frequency resource and a root sequence index for PRACH sequence generation used by the first base station for configuring PRACH communications by UEs.

20. The first base station of claim 17, wherein the beam correspondence information further includes an SSB-to-RACH occasion (RO) mapping used by the first base station for configuring PRACH communications by UEs.

21. A first base station for wireless communication, comprising:
  a memory; and
  one or more processors coupled to the memory, the one or more processors configured to:
    receive, from a second base station, collision avoidance information for avoiding collisions of physical random access channel (PRACH) communications from one or more user equipment (UEs), the collision avoidance information including one or more of subcarrier spacing information indicating a first channel state information resource signal (CSI-RS) resource or beam correspondence information indicating a first synchronization signal block (SSB) identifier;
    determine a PRACH configuration for PRACH communications by the one or more UEs based at least in part on the collision avoidance information, wherein the one or more processors, when determining the PRACH configuration, are configured to select one or more of:
   a different CSI-RS resource than the first CSI-RS resource for the PRACH configuration, or
   a different SSB identifier than the first SSB identifier for the PRACH configuration; and
transmit the PRACH configuration to the one or more UEs.

22. The first base station of claim 21, wherein the one or more processors, when receiving the collision avoidance information, are configured to receive the collision avoidance information over an Xn interface.

23. The first base station of claim 21, wherein the collision avoidance information includes the subcarrier spacing information, the subcarrier spacing information indicating a first subcarrier spacing from among a plurality of subcarrier spacings for PRACH, and wherein the one or more processors, when determining the PRACH configuration, are configured to select a second subcarrier spacing for the PRACH configuration that is different than the first subcarrier spacing.

24. The first base station of claim 21, wherein the collision avoidance information indicates a frequency resource and a root sequence index for PRACH sequence generation, and wherein the one or more processors, when determining the PRACH configuration, are configured to select the frequency resource and the root sequence index for PRACH sequence generation for the PRACH configuration.

25. The first base station of claim 21, wherein the collision avoidance information includes the beam correspondence information, the beam correspondence information including SSB transmission information, and wherein the one or more processors, when determining the PRACH configuration, are configured to select an SSB for the PRACH configuration that is different than an SSB indicated by the SSB transmission information.

26. The first base station of claim 21, wherein the collision avoidance information includes the beam correspondence information, the beam correspondence information including SSB transmission information and an SSB-to-RACH occasion (RO) mapping, and wherein the one or more processors, when determining the PRACH configuration, are configured to identify a first RO based at least in part on the SSB transmission information and the SSB-to-RO mapping and select a second RO for the PRACH configuration that is different than the first RO.

27. The first base station of claim 21, wherein the PRACH configuration corresponds to communication of a message associated with a 4-step RACH procedure.

28. The first base station of claim 21, wherein the PRACH configuration corresponds to communication of a message associated with a 2-step RACH procedure.

29. The first base station of claim 17, wherein the one or more processors are further configured to:
   provide a serving cell, wherein the beam correspondence information indicates one of a channel state information resource signal (CSI-RS) resource in a measurement object for the serving cell or a synchronization signal block (SSB) identifier for the serving cell.

30. The first base station of claim 17, wherein the beam correspondence information includes synchronization signal block (SSB) transmission information.

\* \* \* \* \*